United States Patent [19]

White

[11] 3,763,393

[45] Oct. 2, 1973

[54] LINEARITY CORRECTION CIRCUIT FOR A CATHODE RAY TUBE

[75] Inventor: Hugh Edward White, Hopewell, N.J.

[73] Assignee: RCA Corporation, New York, N.Y.

[22] Filed: May 28, 1970

[21] Appl. No.: 41,251

[52] U.S. Cl. .............................. 315/27 GD, 315/24

[51] Int. Cl. .............................. H01j 29/70

[58] Field of Search .................. 315/27 GD, 27 TD, 315/24, 26

[56] References Cited

UNITED STATES PATENTS 3,205,377 9/1965 Nix .............................. 315/24 X 3,309,560 3/1967 Popodi .............................. 315/24

*Primary Examiner*—Benjamin R. Padgett

*Assistant Examiner*—J. M. Potenza

*Attorney*—H. Christoffersen

[57] ABSTRACT

Deflection waves are applied via the conduction paths of two field-effect transistors, respectively, to the X and Y deflection means of a cathode ray tube. The impedance of each conduction path is controlled by applying to the gate electrode of each transistor a portion of the deflection wave applied to the other transistor.

11 Claims, 6 Drawing Figures

INVENTOR.
HUGH E. WHITE
BY H. Christoffersen
Attorney

INVENTOR
HUGH E. WHITE
BY H. Christoffersen
Attorney

INVENTOR
HUGH E. WHITE
BY H. Christoffersen
Attorney

LINEARITY CORRECTION CIRCUIT FOR A CATHODE RAY TUBE

BACKGROUND OF THE INVENTION

Linearity correction is needed in display devices because the relation between beam deflection and the deflection waveform is nonlinear.

A number of methods are known for correcting the nonlinearity, each of which has its own good and bad features. For example, optical correction utilizes special faceplates such as fiber optics. This method is expensive and has little flexibility. In the case of magnetically deflected displays, external field correction may be used employing permanent or electromagnets. This produces beam deflections in a sense to correct for non-linearities, however, linearity and focusing is not up to standard. Waveshaping techniques are also used in which resistor-capacitor networks predistort the deflection current for each axis. This method gives only first-order approximations because the horizontal correction is not a function of the vertical deflection and vice versa. Such a method, therefore, is not suitable for use in a high quality display having variable deflection rates.

It is the object of this invention to provide a relatively simple and inexpensive linearity correction circuit which is suitable for use in a high quality display.

SUMMARY OF THE INVENTION

A circuit for deflecting the beam of a cathode ray tube along one axis of the cathode ray tube screen compensates for nonlinearity along that axis as a function of the deflection wave for deflecting the beam along a second axis of the screen. The circuit includes an active element having a control electrode, an input electrode to which an input signal may be applied, an output electrode where an output signal is manifested, and a conduction path extending between the input and output electrodes whose impedance may be varied in response to a signal applied to the control electrode. Means are included for applying the deflection wave for the one axis to the input electrode and there are means for applying the deflection wave for the second axis to the control electrode for varying the impedance of the conduction path.

DETAILED DESCRIPTION

Figures 1, 2, 3:
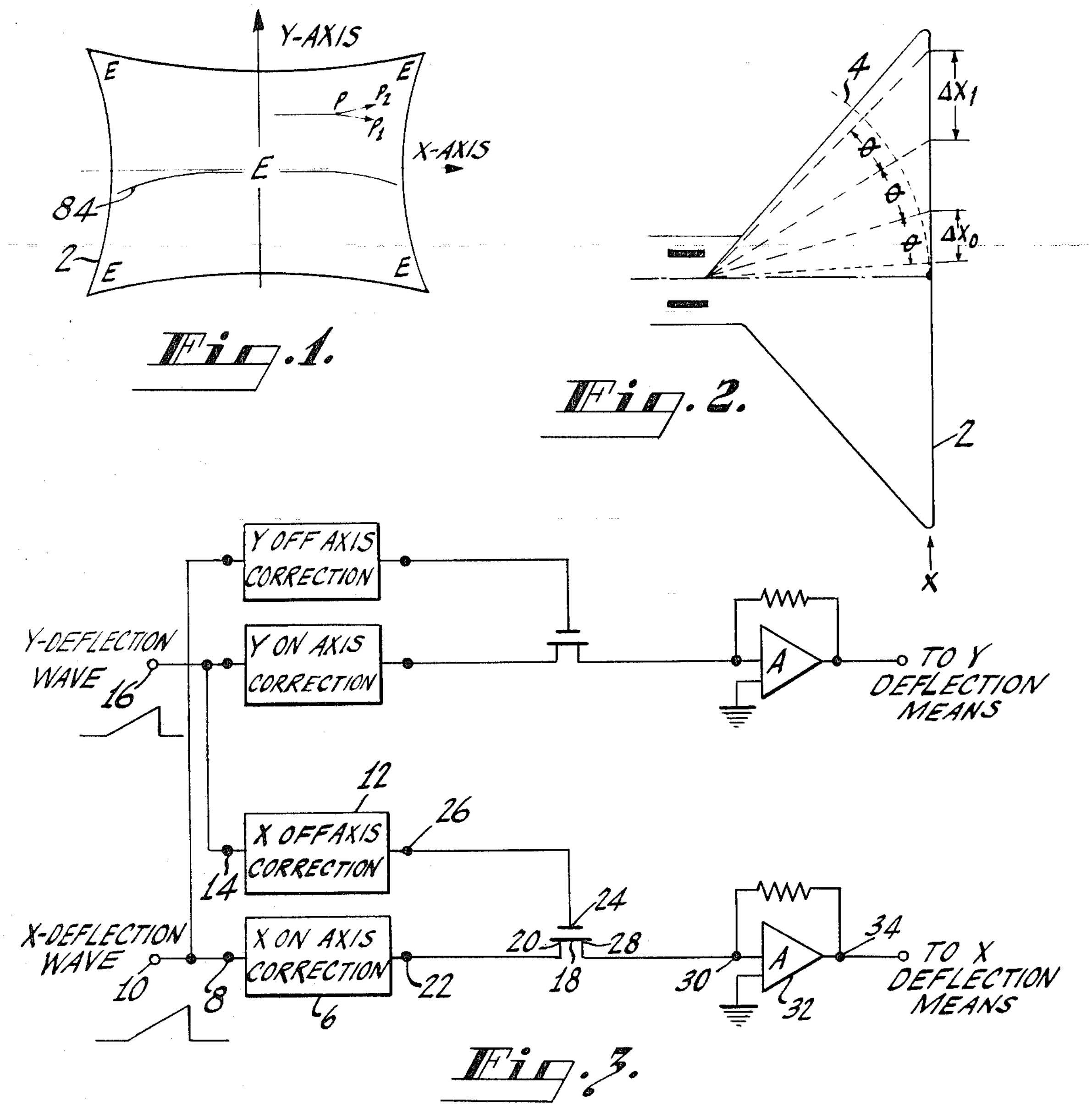
FIG. 1 is a pictorial representation of non-linearity on the face of a cathode ray tube.
FIG. 2 is a graphic representation of deflection distortion on the face of a cathode ray tube.
FIG. 3 is a schematic and block diagram representation of the invention.

The non-linearity (pincushion effect) which is compensated for by this invention is illustrated in FIG. 1. At the center of the display a letter E is essentially non-distorted as the geometry of the display has little or no effect in this region and the deflection levels are at their minimum values. At the four corners of the display, the latter E appears distorted, as shown, due to the geometry of the CRT and the interaction of the deflection levels which are at their maximum levels.

FIG. 2 graphically illustrates in one dimension how non-linearity occurs due to the geometry of a flat faced CRT. The electron beam is deflected along the horizontal (X) axis and it is assumed that the deflection level is zero along the vertical (Y) axis of the CRT. It may be seen that equal increments of deflection signal result in equal angular increment $\theta$ of deflection. There are, however, unequal (non-linear) increments of deflection along the X axis. For example, it may be seen that the increment of deflection $\Delta X1$ is substantially larger than the increment $\Delta X0$. If the face of the CRT were shaped to follow the arc 4 traced by an electron beam having a radius $r$, each increment of deflection $\Delta Xn$ would be equal but it is usually desirable, for other reasons, to employ a flat rather than a curved face.

A circuit embodying the invention which corrects for the above described non-linearity in two dimensions as well as cross-coupled non-linearity is shown in FIG. 3. This circuit may be used in conjunction with curved or flat faced CRT's and is equally applicable to electrostatic or electromagnetic deflection systems, however, in the remainder of the description the circuit is assumed to include an electromagnetic deflection system and a flat faced CRT.

For deflecting the electron beam along one axis of CRT, for example, the horizontal (X) axis, there is a circuit comprising a X on-axis correction network 6 having an input terminal 8 connected to a terminal 10 to which is applied a linear X deflection wave.

An X off-axis correction network 12 has its input terminal 14 connected to a terminal 16 to which is applied the deflection wave for the second axis of deflection for the CRT, for example the vertical or (Y) axis.

An active element, such as field effect transistor 18, has its input (source) electrode 20 connected to the output terminal 22 of circuit 6, and its control (gate) electrode 24 connected to the output terminal 26 of circuit 12. The output (drain) electrode 28 is connected to the input terminal 30 of operational amplifier 32 which has its output terminal 34 connected to the X deflection means for the CRT.

The elements for the vertical deflection circuit are identical to those for the horizontal deflection circuit and therefore are not separately described.

Figures 4, 5:
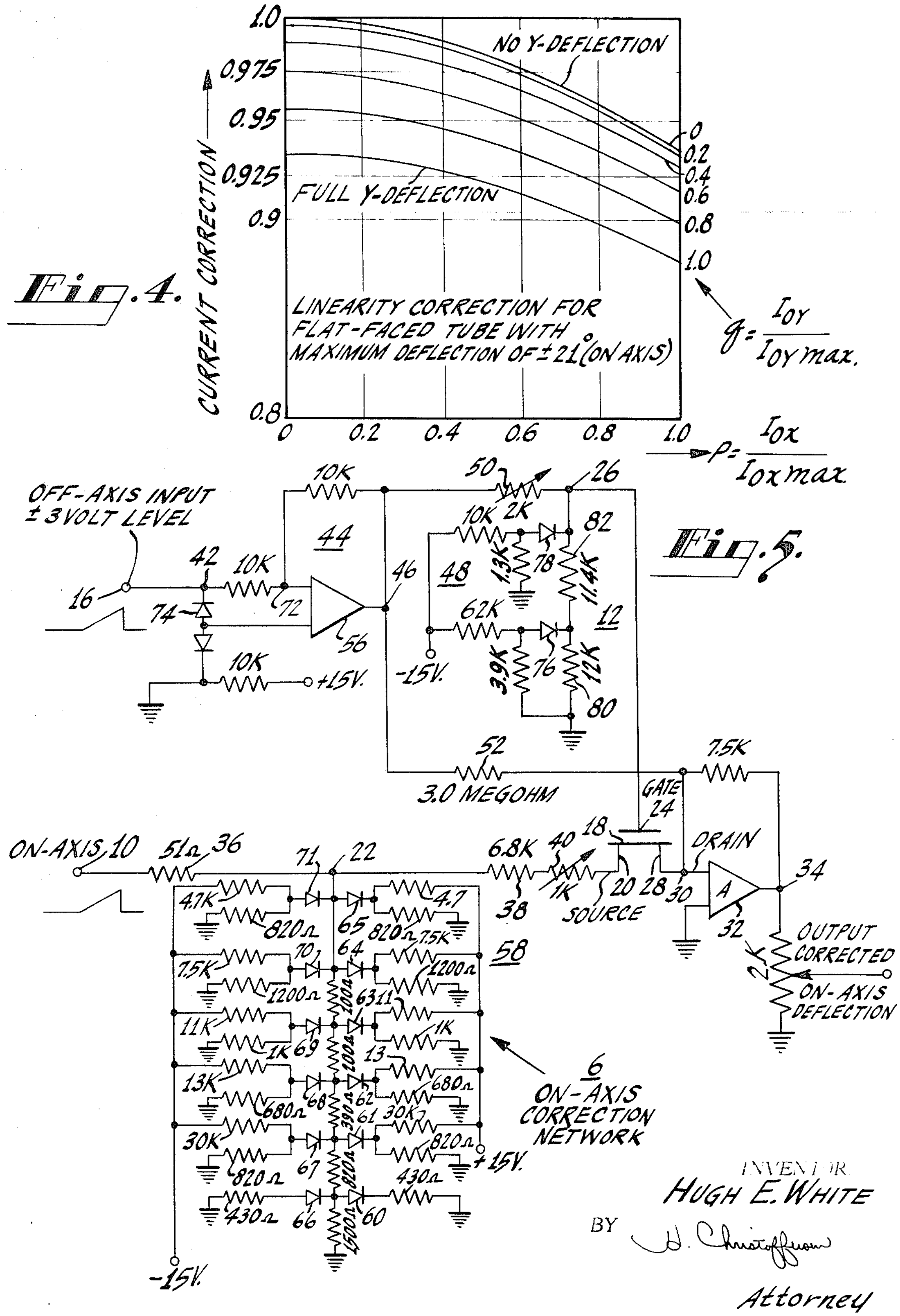
FIG. 4 is a linearity correction curve for a flat faced cathode ray tube.
FIG. 5 is a schematic diagram embodying the invention.

The non-linear characteristics of a CRT are well defined by its dimensions. FIG. 4 illustrates the non-linear characteristics of a flat faced CRT, for example, a 42° deflection flat faced CRT. The abscissa of the graph indicates the ratio P of the X deflection current $Iox$ to the maximum X deflection current $Ioxmax$. The maximum X deflection current is unity (1).

The six curves, beginning in the upper left-hand corner of the graph, indicate the ratio $q$ of the Y deflection current $Ioy$ to the maximum Y deflection current $Ioymax$. The maximum Y deflection current is unity (1).

The ordinate of the graph indicates the amount of current correction needed in the X deflection circuits to compensate for the non-linearities of the tube. For example, if $P = 0.6$ and $q = 0.6$, the current correction needed is approximately 0.95 which is readily found by finding the point on the ordinate at which the $P = 0.6$ and $q = 0.6$ curves intersect. The resultant X current required is (0.6) (0.95) = 0.57 of the peak value of the uncorrected X deflection current.

The field effect transistor 18 is the type that in response to zero volts applied to the gate electrode, the source to drain impedance is at a minumum value, for example 250 ohms. As the gate voltage becomes more negative the source to drain impedance becomes larger. For this particular transistor, the source to drain impedance is linear in the region from 250–750 ohms. A transistor which exhibits this characteristic and which may be used in the practice of the invention is an MPF–105 field effect transistor. In the practice of the invention, the transistor is to be operated in its linear region, surrounding the origins of its voltage, current characteristic.

Assume the Y deflection current is zero, that is, $q = 0$. The output voltage from the off-axis correction circuit 12 is zero and transistor 18 is conducting at saturation. The linear X deflection wave is applied to the on-axis correction circuit where it is made non-linear to approximate the $q = 0$ curve. This corrected wave is coupled via the source drain conduction path of transistor 18 to the input terminal 30 of amplifier 32 and is then applied to the X deflection means.

The $q = 0.2 - 1.0$ curves are approximated by the off-axis correction network 12. As the off-axis deflection wave increases in magnitude, the output signal from network 12 increases negatively in a non-linear manner thereby increasing the source to drain impedance of transistor 18 which decreases the amplitude of the non-linear on-axis deflection wave applied to the X deflection means by way of transistor 18. This is explained in detail below.

Refer to FIG. 5 which shows the X deflection system in detail. The Y deflection system is identical in structure and operation and therefore is not discussed separately. The component sizes shown in the drawing are exemplary only and are not meant to be limiting.

The on-axis input terminal 10 is connected to a resistor 36 which, in turn, is connected to terminal 22 of network 6, the resistor 36 and network 6 forming a voltage divider. Terminal 22 is connected by way of a resistor 38 and a variable resistor 40 to source electrode 20 of transistor 18.

The off-axis network 12 has its input terminal 16 connected to the input terminal 42 of an absolute magnitude circuit 44. The signal appearing at output terminal 46 of circuit 44 is always negative regardless of the polarity of the deflection wave appearing at input terminal 42. Terminal 46 is connected to a non-linear network 48 by way of a variable resistor 50. Network 48 and resistor 50 form a voltage divider network. Output terminal 26 of the off-axis correction network 12 is connected to the gate electrode 24 of transistor 18. Terminal 46 is also connected to the drain electrode 28 of transistor 18 and input terminal 30 of amplifier 32 by way of resistor 52.

Consider now the operation of the circuit of FIG. 5. Initially the circuit is assumed to have zero volts applied to each of the input terminals 10 and 16. As was explained earlier, there is zero volts applied to the gate electrode 24 of transistor 18 causing the transistor to conduct substantially at saturation. Variable resistor 40 is adjusted so the operational amplifier 32 is operating at unity gain. Variable resistor 50 is adjusted to set the proper bias level for transistor 18 such that the $q>0$ curves are substantially approximated by the off-axis circuit.

Figure 6:
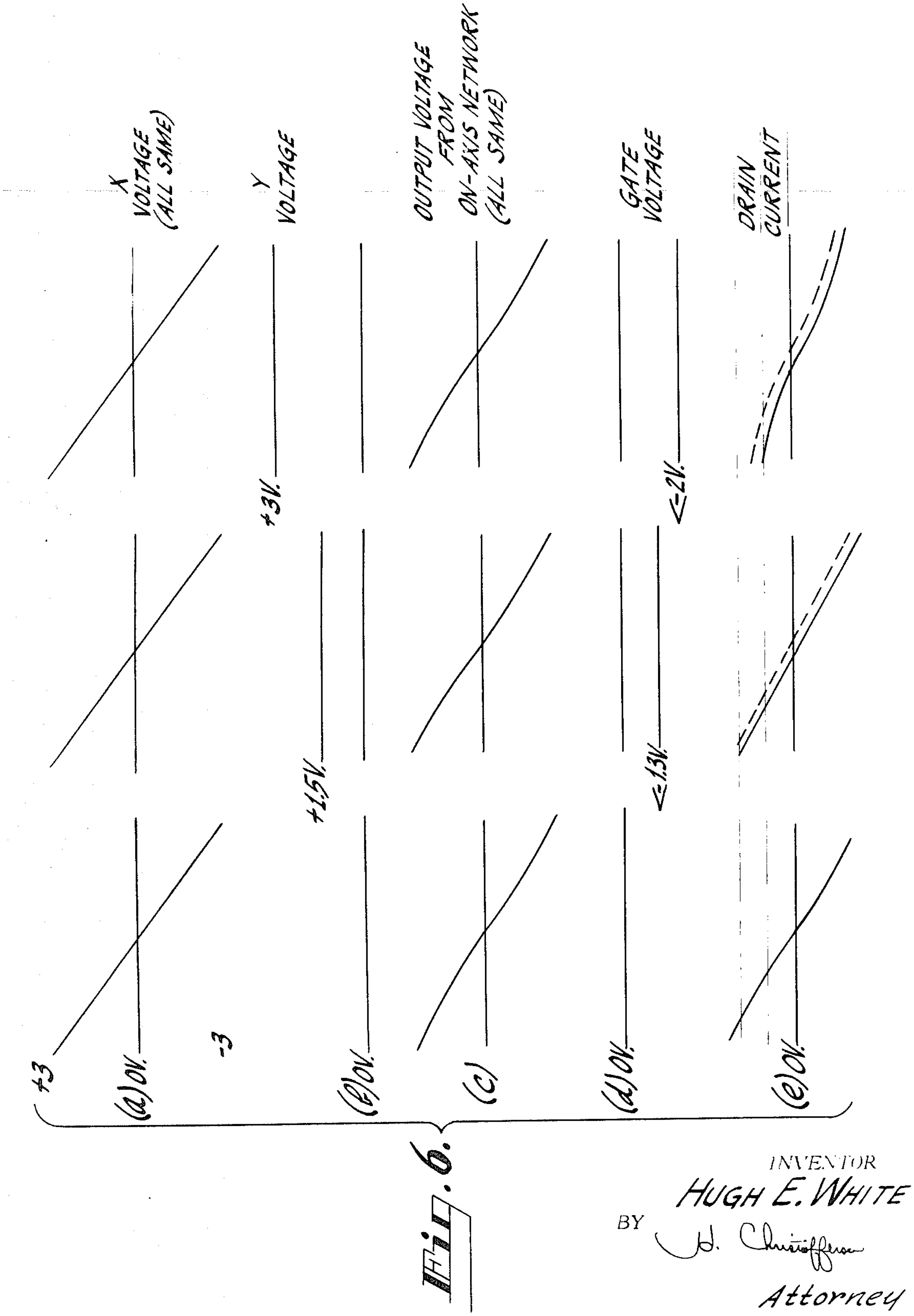
FIG. 6 is a group of waveforms helpful in understanding the operation of the circuit of FIG. 5.

Refer briefly to FIG. 6 which illustrates the waveshapes present in the circuit of FIG. 5 for a number of different values of inputs. The top row of waves, A, which is the same in all columns, is a composite of a linear ramp which extends from +3 volts to −3 volts and which is applied to the on-axis input terminal 10. B illustrates the wave applied to the off-axis input terminal 16. In the leftmost column it has the value 0, in the center column +1.5 volts, and in the right column +3 volts. Since the frequency of the X-axis deflection wave is much higher than that of the Y-axis deflection wave, the latter is illustrated, in each case, as a direct current (dc) level to simplify the illustration and the description of operation of the circuit. Nevertheless, it is to be understood that, in practice, the off-axis (Y) deflection wave is also a ramp wave, but of a much lower frequency, than the X deflection wave. C, which is the same in all columns, illustrates the composite wave present at output terminal 22 of the on-axis correction network 6 for the three different values of B. D shows the three different voltages applied to gate electrode 24 of transistor 18 in response to the three values 0, +1.5 and +3 volts of B. The absolute values at D are less than the corresponding absolute value at B as a result of the non-linear attenuations of network 48.

At the values of wave A in a range close to zero volts, none of the diodes in network 58 conduct and essentially all of the voltage is dropped across the diode resistor matrix 58 as its resistance is much larger than that of resistor 36. At the values of wave A between a positive value of about +½ volt or so to about +3 volts, one or more of the diodes 60–65 conduct, the number conducting depending upon how positive wave A is. For example, at +3 volts, the diodes 60–65 all conduct whereas at a voltage of about +½ volt, only diode 60 conducts. The greater the number of diodes conducting, the greater the effect on the wave C produced at terminal 22. That is, the more non-linear C becomes. Each diode break point approximates a point on the $q = o$ curve.

The resistor-diode matrix 58 operates in a manner similar to that described above for negative values of wave A. As the ramp goes more negative than about −½ volt or so, the diodes 66–71 successively begin to conduct.

If, as shown in the leftmost column of FIG. 6, wave D, 0 volts is applied to gate electrode 24 and wave C is applied to the source electrode, wave E produced at the drain electrode 28 is essentially the same as wave C as transistor 18 is conducting substantially at saturation.

As was stated earlier, the off axis (Y) wave is applied to input terminal 16 which is connected to an input terminal 72 of an operational amplifier 56 which is part of an absolute value circuit 44. The operation of this circuit is well known in the art and is described in detail in "Handbook of Operational Amplifier Applications", p. 69, Burr-Brown Research Corporation, First Edition, Copyright 1963. If a negative voltage is applied to terminal 16, diode 74 conducts and the circuit operates as a voltage follower such that the voltage at terminal 46 is substantially the same as the voltage at terminal 16. If a positive voltage is applied to terminal 16, the diode 74 is non-conductive and the circuit operates as an inverter such that the voltage at terminal 46 is of the same magnitude as the positive wave at terminal 16 but is of a negative polarity.

The center column of FIG. 6 illustrates the waveshapes at the same points in the circuit as the waves of the column but with the off-axis wave B at a leftmost level rather than at ground. The wave B is inverted by absolute value circuit 44 to produce the negative wave which is applied to the off-axis correction network. Reviewing, for a moment, for values of wave D between 0 volts and some negative value such as — 1.2 volts, diodes 76 and 78 are non-conductive and the network 12 has little effect on the value of voltage present at terminal 26 as resistors 80 and 82 together have a value substantially larger than that of variable resistor 50. In the region (0 to −1.2 V) the non-linear gate voltage to FET conductance characteristic closely matches the non-linear current correction required for CRT deflection if the bias level of the FET is properly set by adjusting variable resistance 50. As the voltage D at terminal 46 becomes more negative to a range from say −1.2 to −2.0 volts, (the voltage − 1.5 volts shown in the center column in within this range) diode 76 conducts reducing the resistance from terminal 26 to ground. At values of D greater than −2.0 volts, both diodes 76 and 78 conduct, reducing further the resistance between terminal 26 and ground. The effect on wave E is illustrated in the center and right columns of FIG. 6. Note that wave E in the center column has a smaller amplitude and less steep slope than the wave in the leftmost column. Also not that the wave in the rightmost column has a smaller amplitude and less steep slope than the wave in the center column. This is due to the non-linear negatively increasing wave D applied to the gate electrode which increases the source to drain impedance of transistor 18.

Resistor 52 compensates for the amount the horizontal and vertical deflection coils are not exactly in quadrature. Referring briefly to FIG. 1, it may be seen that the X-axis sweep 84 tends to become non-linear at the maximum deflection levels. As the voltage at terminal 46 becomes greater in magnitude, a small amount of current flows through resistor 52 which is of a large resistance, for example, 3.0 meg-ohm. This current is applied to drain electrode 28 and tends to shift the level of the current wave applied to input terminal 30 of amplifier 32. At E the solid wave illustrates the wave at the drain electrode with resistor 52 in the circuit, whereas the dotted wave illustrates the wave if resistor 52 were not in the circuit.

In summary, the on-axis network 6 and the linear source to drain resistance of transistor 18 approximate the $q = o$ current correction curve (FIG. 4) to compensate for on-axis non-linearity. The off-axis correction network 12 applies a non-linear voltage to the gate electrode 24 of transistor 18 to vary the impedance of the source to drain path of the transistor 18 to compensate for off-axis non-linearity ($q$ = 0.2–1.0 curves). Compensation for lack of quadrature between the horizontal and vertical deflection coils is compensated for by feeding a portion of the linear deflection wave from terminal 46 to drain electrode 28 by way of resistor 52 to shift the level of the deflection wave at the drain electrode.

What is claimed is:

1. In a circuit for deflecting the beam of a cathode ray tube along one axis of the cathode ray tube screen, a circuit for compensating for nonlinearity along that axis as a function of the deflection wave for deflecting said beam along a second axis of said screen, in combination:

an active element having a control electrode, an input electrode to which an input signal may be applied, an output electrode where an output signal is manifested, and a conduction path insulated from said control electrode extending between the input and output electrodes, whose impedance may be varied in response to a signal applied to the control electrode;

means for applying a deflection wave for said one axis to said input electrode; and means for applying said deflection wave for said second axis to said control electrode for varying the impedance of said conduction path.

2. The combination claimed in claim 1, including a deflection means for said one axis and further including means for applying without correction the signal manifested at said output electrode to said deflection means.

3. The combination claimed in claim 1, including means for shifting the level of the signal manifested at said output electrode.

4. The combination claimed in claim 1, said active element comprising a field effect transistor.

5. In a linearity correction circuit for a display device having deflection means, the combination comprising:

an active element having a control electrode, an input electrode to which an input signal may be applied, an output electrode where an output signal is manifested, and a conduction path extending between the input and output electrodes, whose impedance may be varied in response to a signal applied to the control electrode;

means for applying an on-axis deflection wave to said input electrode;

means for separately applying an off-axis deflection wave which is isolated from said on-axis deflection wave to said control electrode for varying the impedance of said conduction path; and means for applying, without further linearity correction, the signal present in said conduction path to the deflection means for said display device.

6. In a linearity correction circuit for a display device, the combination comprising:

an active element having a control electrode, an input electrode to which an input signal may be applied, an output electrode where an output signal is manifested, and a conduction path insulated from said control electrode extending between the input and output electrodes, whose impedance may be varied in response to a signal applied to the control electrode;

means for applying a nonlinear on-axis deflection wave to said input electrode; and means for applying a nonlinear off-axis deflection wave to said control electrode for varying the impedance of said conduction path.

7. The combination claimed in claim 6, including means for applying a portion of a linear off-axis deflection wave to said output electrode.

8. The combination claimed in claim 7, wherein said on-axis and off-axis deflection means include means providing the necessary linearity correction and further including a deflection means and a means for applying the signal manifested at said output electrode to said deflection means.

9. In a circuit for deflecting the beam of a cathode ray tube along one axis of the cathode ray tube screen, a circuit for compensating the nonlinearity along that axis as a function of the deflection wave for deflecting said beam along a second axis of said screen, in combination:

an active element having a control electrode, an input electrode to which an input signal may be applied, an output electrode where an output signal is manifested, and a conduction path extending between the input and output electrodes, whose impedance may be varied in response to a signal applied to the control electrode;

means for applying a first nonlinear deflection wave for said one axis to said input electrode;

means for applying a second nonlinear deflection wave for said second axis which is isolated from said first wave to said control electrode for varying the impedance of said conduction path;

means for applying a portion of a linear deflection wave for said second axis to said output electrode; and a deflection means for said one axis and means for applying the signal manifested at said output electrode to said deflection means.

10. In a circuit for deflecting the beam of a cathode ray tube along one axis of the cathode ray screen, a circuit for compensating for nonlinearity along that axis as a function of the deflection wave for deflecting said beam along a second axis of said screen, in combination:

an active element having a control electrode, an input electrode to which an input signal may be applied, an output electrode where an output signal is manifested, and a conduction path extending between the input and output electrodes, whose impedance may be varied in response to a signal applied to said control electrode;

means for applying a deflection wave for said one axis to said input electrode;

absolute magnitude means receptive of an input wave for said second axis, which wave has excursions above and below a reference level for producing a unipolar wave having a value equal to the absolute magnitude of the difference between the input wave value and reference level value; and means responsive to said unipolar wave for producing a nonlinear signal as a function of said unipolar wave, said nonlinear signal being applied to said control electrode for varying the impedance of said conduction path.

11. The combination as set forth in claim 10 further including means coupled to said output terminal for producing a deflection signal for deflecting said beam along said one axis as a linear function of said resistance of said active element.

* * * * *